March 9, 1948.  A. COX  2,437,505
OPTICAL OBJECTIVE
Filed April 30, 1946
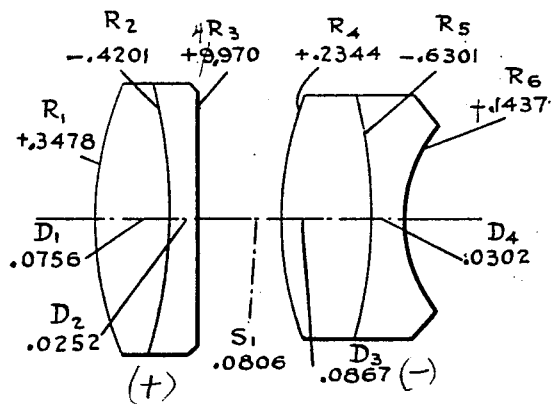
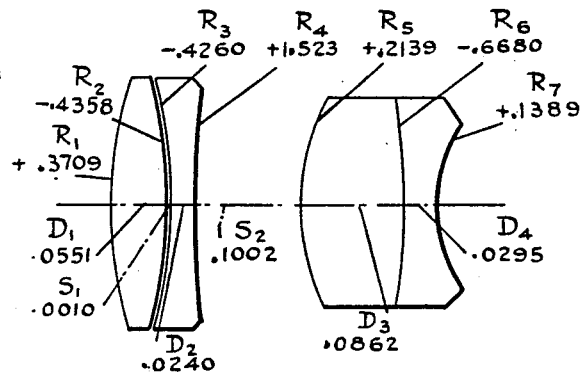
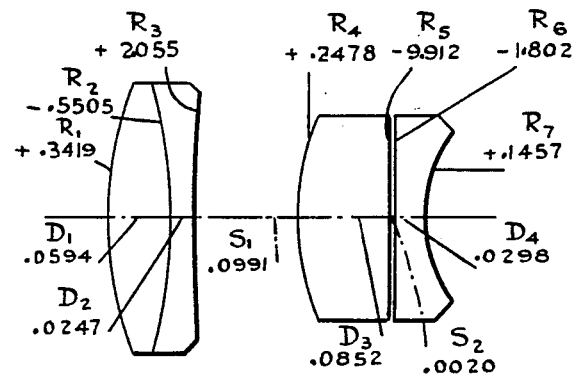
INVENTOR
ARTHUR COX
BY Emery Holcombe & Blair
ATTORNEYS Patented Mar. 9, 1948

2,437,505

UNITED STATES PATENT OFFICE 2,437,505

OPTICAL OBJECTIVE

Arthur Cox, Leicester, England, assignor to Taylor, Taylor & Hobson Limited, Leicester, England, a company of Great Britain Application April 30, 1946, Serial No. 666,060
In Great Britain June 15, 1945

13 Claims. (Cl. 88—57)

This invention relates to optical objectives of the kind known as telephoto objectives, which are corrected for spherical and chromatic aberrations, coma, astigmatism and field curvature, and in which the axial distance from the front surface of the objective to the back focal plane is materially less than in objectives of the conventional types of the same focal length and aperture. Such objectives usually comprise a convergent member disposed in front of and widely spaced from a divergent member, each member being composed of a group of two or more lens elements disposed close together and commonly (though not invariably) cemented together, the nodal points of the objective both lying in front of the front surface of the objective. It should be made clear that the "front" of the objective is to be understood as the side of the longer conjugate in accordance with the usual convention. In most telephoto objectives the two members (whether having internal airgaps or not) are of meniscus form with their concave faces towards one another.

The present invention has for its object to secure improved spherical aberration correction in the simple type of telephoto objective in which each member consists of a cemented or uncemented doublet having a convergent element and a divergent element.

In the objective according to the invention the divergent rear member consists of a meniscus doublet with its bounding surfaces convex to the front, the front surface of such member having a radius of curvature lying between .20 and .30 times the equivalent focal length of the objective, whilst the radius of curvature of the rear surface of such member lies between .10 and .20 times such focal length, and the axial thickness of the convergent element in the convergent front doublet is not less than .045 times such focal length.

The axial air separation between the convergent front member and the divergent rear member of the objective is preferably not greater than .125 times the equivalent focal length of the objective, and the axial thickness of the convergent element of the divergent rear member is preferably not less than .05 times such focal length.

The two elements of each member may be cemented together or may be separated from one another by a small airgap. When the two elements of the divergent rear member are cemented together, the cemented surface is preferably concave to the front. In such case, the radius of curvature of the cemented surface conveniently lies between .40 and 2.00 times the equivalent focal length of the objective, and it is also preferable for the divergent element to be made of a material whose mean refractive index exceeds that for the convergent element cemented to it by not less than .045.

In the accompanying drawings,

Figures 1, 2 and 3 respectively illustrate three convenient practical examples of telephoto objective according to the invention.

Numerical data for these examples are given in the following tables, in which $R_1$, $R_2$ ... represent the radii of curvature of the individual surfaces of the objective counting from the front (the positive sign indicating that the surface is convex to the front and the negative sign that it is concave thereto), $D_1$, $D_2$ ... represent the axial thicknesses of the individual lens elements, and $S_1$, $S_2$ ... represent the axial air separations between the elements. The tables also give the mean refractive indices, for the D-lines, and the Abbé V numbers of the materials of which the lens elements are made.

*Example I*

| Equivalent focal length 1.000 | | Relative Aperture F/3.5 | |
|---|---|---|---|
| Radius | Thickness or Air Separation | Refractive Index $n_D$ | Abbé V Number |
| $R_1$+.3478 | $D_1$ .0756 | 1.623 | 60.3 |
| $R_2$−.4201 | $D_2$ .0252 | 1.699 | 30.3 |
| $R_3$+4.970 | $S_1$ .0806 | | |
| $R_4$+.2344 | | | |
| $R_5$−.6301 | $D_3$ .0867 | 1.547 | 45.8 |
| $R_6$+.1437 | $D_4$ .0302 | 1.613 | 57.6 |

*Example II*

| Equivalent focal length 1.000 | | Relative Aperture F/3.5 | |
|---|---|---|---|
| Radius | Thickness or Air Separation | Refractive Index $n_D$ | Abbé V Number |
| $R_1$+.3709 | $D_1$ .0551 | 1.690 | 54.6 |
| $R_2$−.4358 | $S_1$ .0010 | | |
| $R_3$−.4260 | $D_2$ .0240 | 1.699 | 30.5 |
| $R_4$+1.523 | $S_2$ .1002 | | |
| $R_5$+.2139 | $D_3$ .0862 | 1.547 | 45.7 |
| $R_6$−.6680 | $D_4$ .0295 | 1.613 | 57.6 |
| $R_7$+.1389 | | | |

Example III

| Equivalent focal length 1.000 | | Relative Aperture F/3.5 | |
|---|---|---|---|
| Radius | Thickness or Air Separation | Refractive Index $n_D$ | Abbé V Number |
| $R_1$+.3419 | $D_1$ .0594 | 1.623 | 60.2 |
| $R_2$−.5505 | $D_2$ .0247 | 1.699 | 30.5 |
| $R_3$+2.055 | $S_1$ .0991 | | |
| $R_4$+.2478 | $D_3$ .0852 | 1.644 | 48.3 |
| $R_5$−9.912 | $S_2$ .0020 | | |
| $R_6$−1.802 | $D_4$ .0298 | 1.613 | 57.6 |
| $R_7$+.1457 | | | |

The back focal length in Example I is .5253, in Example II .5227 and in Example III .5293 times the equivalent focal length of the objective.

Example I employs cemented contact surfaces in both members, whilst the other two examples each have one cemented contact and one broken contact, that is with a small air gap between the two elements of the member. In Example II the broken contact is in the convergent front member, whilst in Example III the broken contact is in the divergent rear member.

What I claim as my invention and declare to secure by Letters Patent is:

1. A telephoto objective corrected for spherical and chromatic aberrations, coma, astigmatism and field curvature, and comprising a convergent front member and a divergent rear member, each member being in the form of a meniscus doublet with its bounding surfaces convex to the front and having a convergent element and a divergent element, the front surface of the divergent rear member having a radius of curvature lying between .20 and .30 times the equivalent focal length of the objective, whilst the radius of curvature of the rear surface of such member lies between .10 and .20 times such equivalent focal length, and the axial thickness of the convergent element of the convergent front member is not less than .045 times and not greater than .095 times such equivalent focal length.

2. A telephoto objective as claimed in claim 1, in which the axial air separation between the convergent front member and the divergent rear member of the objective is not greater than .125 times and not less than .0625 times the equivalent focal length of the objective.

3. A telephoto objective as claimed in claim 1, in which the axial thickness of the convergent element of the divergent rear member is not less than .05 times and not greater than .110 times the equivalent focal length of the objective.

4. A telephoto objective as claimed in claim 1, in which the two elements of the divergent rear member are cemented together, the radius of curvature of such cemented surface lying between .40 and 2.00 times the equivalent focal length of the objective, such surface being concave to the front.

5. A telephoto objective as claimed in claim 1, in which the divergent element of the divergent rear member is disposed behind and cemented to the convergent element thereof, and is made of a material whose mean refractive index exceeds that of the convergent element by not less than .045.

6. A telephoto objective as claimed in claim 1, in which the divergent element of the divergent rear member is made of a material having mean refractive index exceeding that of the associated convergent element by not less than .045, and is disposed behind and cemented to such convergent element, the cemented surface being concave to the front and having radius of curvature between .40 and 2.00 times the equivalent focal length of the objective.

7. A telephoto objective corrected for spherical and chromatic aberrations, coma, astigmatism and field curvature, and comprising a convergent front member and a divergent rear member axially separated from one another by not more than .125 times the equivalent focal length of the objective, each member being in the form of a meniscus doublet with its bounding surfaces convex to the front and having a convergent element and a divergent element, the front surface of the divergent rear member having a radius of curvature lying between .20 and .30 times the equivalent focal length of the objective, whilst the radius of curvature of the rear surface of such member lies between .10 and .20 times such equivalent focal length, and the axial thicknesses of the convergent elements of the front member and of the rear member are respectively not less than .045 and .05 times and not greater than .095 and .110 times such equivalent focal length.

8. A telephoto objective as claimed in claim 7, in which the two elements of the divergent rear member are cemented together, the radius of curvature of such cemented surface lying between .40 and 2.00 times the equivalent focal length of the objective, such surface being concave to the front.

9. A telephoto objective as claimed in claim 7, in which the divergent element of the divergent rear member is disposed behind and cemented to the convergent element thereof, and is made of a material whose mean refractive index exceeds that of the convergent element by not less than .045.

10. A telephoto objective as claimed in claim 7, in which the divergent element of the divergent rear member is made of a material having mean refractive index exceeding that of the associated convergent element by not less than .045, and is disposed behind and cemented to such convergent element, the cemented surface being concave to the front and having radius of curvature between .40 and 2.00 times the equivalent focal length of the objective.

11. A telephoto objective having numerical data substantially as set forth in the following table:

| Equivalent focal length 1.000 | | Relative Aperture F/3.5 | |
|---|---|---|---|
| Radius | Thickness or Air Separation | Refractive Index $n_D$ | Abbé V Number |
| $R_1$+.3478 | $D_1$ .0756 | 1.623 | 60.3 |
| $R_2$−.4201 | $D_2$ .0252 | 1.699 | 30.3 |
| $R_3$+4.970 | $S_1$ .0806 | | |
| $R_4$+.2344 | $D_3$ .0867 | 1.547 | 45.8 |
| $R_5$−.6301 | $D_4$ .0302 | 1.613 | 57.6 |
| $R_6$+.1437 | | | | wherein $R_1, R_2 \ldots$ represent the radii of curvature of the individual surfaces, the positive sign indicating that the surface is convex to the front and the negative sign that it is concave thereto, $D_1, D_2 \ldots$ represent the axial thicknesses of the individual elements, and $S_1$ represents the axial air separation between the two members.

12. A telephoto objective having numerical data substantially as set forth in the following table:

| Equivalent focal length 1.000 | | Relative Aperture F/3.5 | |
|---|---|---|---|
| Radius | Thickness or Air Separation | Refractive Index $n_D$ | Abbé V Number |
| $R_1+.3709$ | $D_1$ .0551 | 1.690 | 54.6 |
| $R_2-.4358$ | $S_1$ .0010 | | |
| $R_3-.4260$ | $D_2$ .0240 | 1.699 | 30.5 |
| $R_4+1.523$ | $S_2$ .1002 | | |
| $R_5+.2139$ | $D_3$ .0862 | 1.547 | 45.7 |
| $R_6-.6680$ | $D_4$ .0295 | 1.613 | 57.6 |
| $R_7+.1389$ | | | | wherein $R_1, R_2 \ldots$ represent the radii of curvature of the individual surfaces, the positive sign indicating that the surface is convex to the front and the negative sign that it is concave thereto, $D_1, D_2 \ldots$ represent the axial thicknesses of the individual elements, and $S_1, S_2$ represent the axial air separations between the components.

13. A telephoto objective having numerical data substantially as set forth in the following table:

| Equivalent focal length 1.000 | | Relative Aperture F/3.5 | |
|---|---|---|---|
| Radius | Thickness or Air Separation | Refractive Index $n_D$ | Abbé V Number |
| $R_1+.3419$ | $D_1$ .0594 | 1.623 | 60.2 |
| $R_2-.5505$ | $D_2$ .0247 | 1.699 | 30.5 |
| $R_3+2.055$ | $S_1$ .0991 | | |
| $R_4+.2478$ | $D_3$ .0852 | 1.644 | 48.3 |
| $R_5-9.912$ | $S_2$ .0020 | | |
| $R_6-1.802$ | $D_4$ .0298 | 1.613 | 57.6 |
| $R_7+.1457$ | | | | wherein $R_1, R_2 \ldots$ represent the radii of curvature of the individual surfaces, the positive sign indicating that the surface is convex to the front and the negative sign that it is concave thereto, $D_1, D_2 \ldots$ represent the axial thicknesses of the individual elements, and $S_1, S_2$ represent the axial air separations between the components.

ARTHUR COX.

REFERENCES CITED

The following references are of record in the file of this patent:

UNITED STATES PATENTS

| Number | Name | Date |
|---|---|---|
| 1,156,743 | Booth | Oct. 12, 1915 |
| 1,485,515 | Merte | Mar. 4, 1924 |
| 2,354,503 | Cox | July 25, 1944 |

FOREIGN PATENTS

| Number | Country | Date |
|---|---|---|
| 83,277 | Germany | Oct. 15, 1895 |